(12) United States Patent
Van De Waerdt et al.

(10) Patent No.: US 7,975,093 B2
(45) Date of Patent: Jul. 5, 2011

(54) CACHE WITH HIGH ACCESS STORE BANDWIDTH

(75) Inventors: Jan-Willem Van De Waerdt, San Jose, CA (US); Carlos Basto, Sunnyvale, CA (US)

(73) Assignee: NXP B.V., Eindhoven (NL)

( * ) Notice: Subject to any disclaimer, the term of this patent is extended or adjusted under 35 U.S.C. 154(b) by 569 days.

(21) Appl. No.: 12/090,689

(22) PCT Filed: Oct. 18, 2006

(86) PCT No.: PCT/IB2006/053847
§ 371 (c)(1),
(2), (4) Date: Apr. 18, 2008

(87) PCT Pub. No.: WO2007/046066
PCT Pub. Date: Apr. 26, 2007

(65) Prior Publication Data
US 2008/0209129 A1    Aug. 28, 2008

Related U.S. Application Data

(60) Provisional application No. 60/728,576, filed on Oct. 19, 2005.

(51) Int. Cl.
*G06F 12/08* (2006.01)
(52) U.S. Cl. ............. 711/3; 711/127; 711/140; 711/207
(58) Field of Classification Search .................. None
See application file for complete search history.

(56) References Cited

U.S. PATENT DOCUMENTS

| | | | | |
|---|---|---|---|---|
| 5,680,572 A * | 10/1997 | Akkary et al. | ........... | 711/126 |
| 5,907,860 A | 5/1999 | Garibay, Jr. et al. | | |
| 6,138,206 A * | 10/2000 | Fisher et al. | ........... | 711/118 |
| 7,257,673 B2 * | 8/2007 | Emerson et al. | ........... | 711/108 |

* cited by examiner

Primary Examiner — Gary J Portka

(57) ABSTRACT

A cache memory system and method for supporting multiple simultaneous store operations using a plurality of tag memories is provided. The cache data system further provides a plurality of multiple simultaneous cache store functions along with a single cache load function that is simultaneous with the store functions. Embodiments create a cache memory wherein the cache write buffer does not operate as a bottle neck for data store operations into a cache memory system or device.

6 Claims, 3 Drawing Sheets

CACHE WITH HIGH ACCESS STORE BANDWIDTH

BACKGROUND OF THE INVENTION

The present invention relates to cache memories and methods for storing and loading data thereon. In particular, the present invention is directed toward cache memory devices and system architectures that utilize single ported SRAMs with bit write functionality that can simultaneously support multiple store operations or simultaneously support at least one store operation along with a load operation on the cache data memory.

BRIEF SUMMARY OF THE INVENTION

Embodiments of the present invention include a cache memory system. The cache memory system includes both a cache data memory that stores cache data and two or more cache tag memories that store cache tags and valid bits. Slot (0) address calculation logic calculates store operation addresses. A slot (0) tag arbiter receives address information from the slot (0) address calculation logic and uses that information to access a slot (0) tag SRAM. A cache write buffer receives and stores pending store data intended for the cache data memory. Also, a slot (1) address logic circuit is used to calculate store operation addresses for a slot (1) tag SRAM and load operation addresses for the cache data. A slot (1) tag arbiter receives address information from the slot (1) address calculation logic and attempts to access the slot (1) tag SRAM. The combination of the slot (0) tag SRAM, the slot (1) tag SRAM, and the cache write buffer are utilized to perform two substantially simultaneous store operations into a cache data memory. In other embodiments of the present invention, the cache data memory comprises a single ported SRAM memory device. Also other embodiments of the present invention allow for simultaneous loading and storing of data in the cache data memory via the slot (1) and slot (0) addresses, respectively. Yet other embodiments of the invention provide for a cache data memory that utilizes a plurality of SRAM devices. The plurality of SRAM devices within the cache data memory provide a means for cache data interleaving based upon memory addresses. Such interleaving allows for the bandwidth of the data flow to be increased over cache data memories that do not utilize multiple separate single ported SRAM memory devices in the cache data memory.

Additional embodiments of this invention comprise a cache system that is considered to be a pseudo-multi-ported cache system. Such a cache system requires a smaller amount of space than a similar cache system designed with multi-ported SRAM memories.

Still in other embodiments of the present invention, multiple tag SRAM memories can be added to the cache system thereby allowing for additional simultaneous store functionality in the cache memory. That is, two or more tag SRAM memories can allow for two or more slots (up to N slots where N is a positive integer) enabling store data for each slot to be simultaneously stored in the cache memory system's cache data memory.

Additional embodiments of the invention provide for a method that utilizes a pseudo-multi-ported cache system wherein slot (0) store data is stored in a cache data memory at substantially the same time as slot (1) store data is stored in the same cache data memory.

The above summary of the invention is not intended to represent each embodiment or every aspect of the present invention.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE EXEMPLARY EMBODIMENTS OF THE INVENTION

Caches have been utilized for many years. Furthermore, various design techniques have been used to exploit the temporal and spatial locality of memory address references. Caches are frequently used in microprocessor and other processor designs. Present day processors typically have a memory address space of 16, 32 or 64 bits. Such memory address spaces result in a 216, 232, or 264 individually addressable data elements in the memory space. To cope with such a large amount of address space, a memory hierarchy of data storing structures that exploit the locality in memory address references typically supports such processors. Generally, the memory storage structures located close to a processor allow for fast access to the stored elements within the structures (i.e., L1 memory). Such stored structures that are located close to the processor typically have a relatively small storage capacity. This smaller storage capacity is typically not large enough to capture all the individually addressable storage elements in the processor's address space. The storage structures that are positioned more distant from the processor (i.e. L2 memory) generally have slower access times than the storage structures located close to the processor. The storage structures more distant from the processor generally have much larger storage capacity than the storage structures located close to the processor. A well-balanced memory hierarchy tries to provide fast access to all storage elements that are required by the processor. Fast access by the processor can be achieved by applying a cache design to storage structures that are closer to the processor because a cache structure tries to exploit locality in memory address references.

The following is a short description of a prior art direct-mapped cache design 10 (associative cache designs exist as well, but are not of interest with respect to the scope of embodiments of the present invention).

Figure 1:
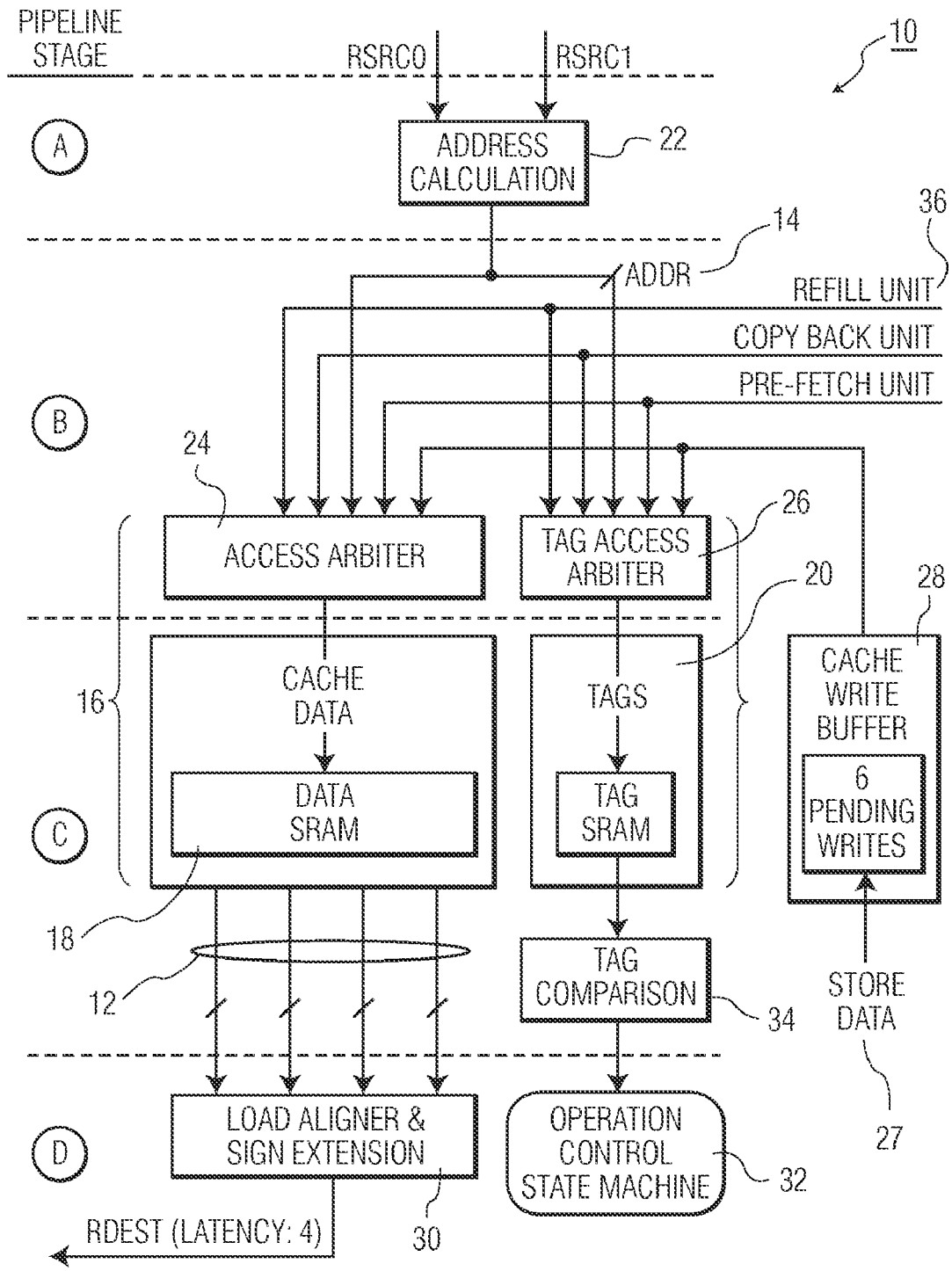
FIG. 1 is a block diagram of a direct-mapped cache design.

Referring now to FIG. 1, wherein a prior art direct-mapped cache design 10 is depicted. Assume a memory address space of 32-bits. With a memory address space of 32-bits, a total of 232 or four giga data elements can be individually addressed. To simplify this discussion, we will talk about bytes, rather than data elements. Further, assume, for example, that the cache device 10 has a storage capacity of 64K bytes (216 bytes), and a cache block size (also known as line size) of 32 bytes. A cache block 12 is a group of consecutive bytes that are transferred as a single data entity between the cache 10 and other storage structures in the memory hierarchy 30. In order for a memory address to reference a byte in the address space, the memory address is represented by 32-bit value A[31:0], in which bit 31 is the most significant bit of the address, and bit 0 is the least significant bit of the address. The address A is used to access the cache 10. In the example in FIG. 1, a 64K byte cache, with a 32-byte block size, bits 31 down to 16 are used as a tag, bits 15 down to 5 are used as a block address (also known as a line or a set address), and bits 4 down to zero are used as a byte index. The block address is used to index both the cache's tag memory 20 and the data memory 18 that are included in the cache memory structure 16. The retrieved tag from the tag memory 20 is compared to the tag that is part of address A. This is done to determine whether the referenced block is present in the cache 10. The retrieved block from the data memory 18 is used to select the referenced byte element. The referenced byte element is selected by using the byte index value of the address A.

Still referring to FIG. 1, the prior art cache design 10 uses single ported SRAMs with bit write functionality. In other words, the memories allow selected updates of certain bits in a memory location as identified by a bit mask. This functionality allows the selective merging of data at a memory location through selective updates, without first retrieving the data at the location.

Still referring to FIG. 1, the flow of the store operations and load operations through the cache pipeline is provided. Store operations have their addresses calculated in stage A by address calculation circuitry 22. In stage B, access to the tag memory structure 20 is requested via the tag arbiter 26. Access to the tag memory structure is based on the slot that the store operation is related to. It should be understood that store operations do not need access to the data memory structure 18, since there is no requirement to retrieve data from the cache memory structure during a store operation. In stage C, the tag memory portion 20 of the tag memory structure 16 is accessed. The tag comparison logic 34 derives a cache hit signal (if a hit is made), along with other control information. In stage D, an operation control state machine 32 acts on the control information provided from the tag comparison logic 34. In the case of a cache miss, a cache line is allocated. In the case of a cache hit, the data to be stored (store data) in cache memory 18 portion of the cache memory structure 16 is sent to the cache write buffer (CWB) 28. One cycle later, the store data is presented to the CWB 28 and the CWB 28 requests access to the data memory structure 18. When access to the cache data memory structure 18 is granted, the store data is put into the cache data memory structure 18 in a subsequent cycle. When access is not granted to the cache data memory structure 18, the updating of the store data 27 into the memory structure 16 and, in particular, into the cache data memory 18 is postponed to another point in time, at which the CWB 28 is granted access to the structure. In the meantime, the store data 27 remains pending in the CWB 28, which provides storage capacity for up to six pending stores.

Load operations have their addresses calculated in stage A by the address calculation circuitry 22. In stage B, access to the tag memory structure 20 and the data memory structures 18 are requested via the tag access arbiter 26 and the data memory access arbiter 24, respectively. In stage C, the memory structures 16 are accessed. That is, the cache data structure 18 and the tag memory structure 20 are accessed. The cache data memory 18 provides data for the data way 12. Furthermore, load addresses that conflict with preceding store operations that reside in either stage D operations or in the CWB 28 are identified in the load aligner and sign extension circuitry 30. The control state machine 32 acts upon the provided control information derived from the tag comparison logic 34. In the case of a case miss, a cache line is retrieved from memory by a refill unit via the refill unit line 36 (the refill unit is not specifically shown). In the case of an address conflict with a proceeding store operation, the store data is put into the data memory structure 16, and the load operation is re-executed.

As is understood from FIG. 1 and the flow description of store and load operations through prior art cache pipeline 10, one can conclude that the immediate availability of the data memory structure 16 is only required for load operations. Load operations generally have a fixed operation latency (four in this exemplary embodiment). The store operations, however, do not have an operation latency, and their data update can be postponed to a later point in time to when the data structure 16 becomes available.

The tag and memory structures (18, 20) of the prior art cache pipeline 10 systems are typically built from single ported SRAM memories. That is, the data SRAM 20 and tag SRAM 18 are each made of single ported SRAM memories. These single ported SRAM memories are used because they are inexpensive, require a small amount of circuit area, and are considered to be fast memory circuitry. However, their single ported nature puts restrictions on their use. It is true that multi-ported SRAMs are now available, but multi-ported SRAMs are relatively expensive and require a larger footprint or area on the silicon. Furthermore, multi-ported SRAMs are slower than their single ported SRAM counterparts. Therefore, supporting multiple simultaneous load and store operations with multi-ported SRAM designs is not desirable due to the amount of silicon area required and the slower clock frequency that they operate at. Alternative cache memory approaches have been created in prior art. These approaches typically use "pseudo dual ported" SRAM devices. Such cache memory systems made from pseudo dual ported SRAM devices may support multiple simultaneous load and store operations, but suffer from decreased performance when their "pseudo" nature is not able to support simultaneous operations without performance loss. As such, what is needed is a cache memory that can operate at a high bandwidth but does not suffer from decreased performance when multiple simultaneous load and/or store operations are being performed.

In embodiments of the present invention, a pseudo multi-ported cache is provided that supports multiple simultaneous store operations and single load operations at a small additional cost in terms of silicon area or footprint. After carefully reviewing the FIG. 1 flow of the prior art store and load operations through a prior art cache pipeline using single ported or pseudo dual ported SRAM structures, it was noted that the immediate availability of the data memory structure is only required for load operations. Load operations have a fixed operation latency of 4, which is counted upon for compiler operations scheduling. The store operations, however, do not have an operation latency, and their data update functionality can be postponed to a later point in time when the data memory structure becomes available.

To provide support for two unrestricted store operations, embodiments of the invention can suffice with merely doubling the tag memory of the prior art structures. If two unrestricted load operations were desired, the data memory would have to have its area and memory size double (when compared with a prior art cache system of FIG. 1). Since doubling the memory in a data memory structure is more expensive than doubling the memory in the tag memory structure and since the cache line tag entry requires significantly fewer bits than a cache data line structure, it became apparent that doubling of the tag memory was advantageous to embodiments of the present invention.

Figure 2:
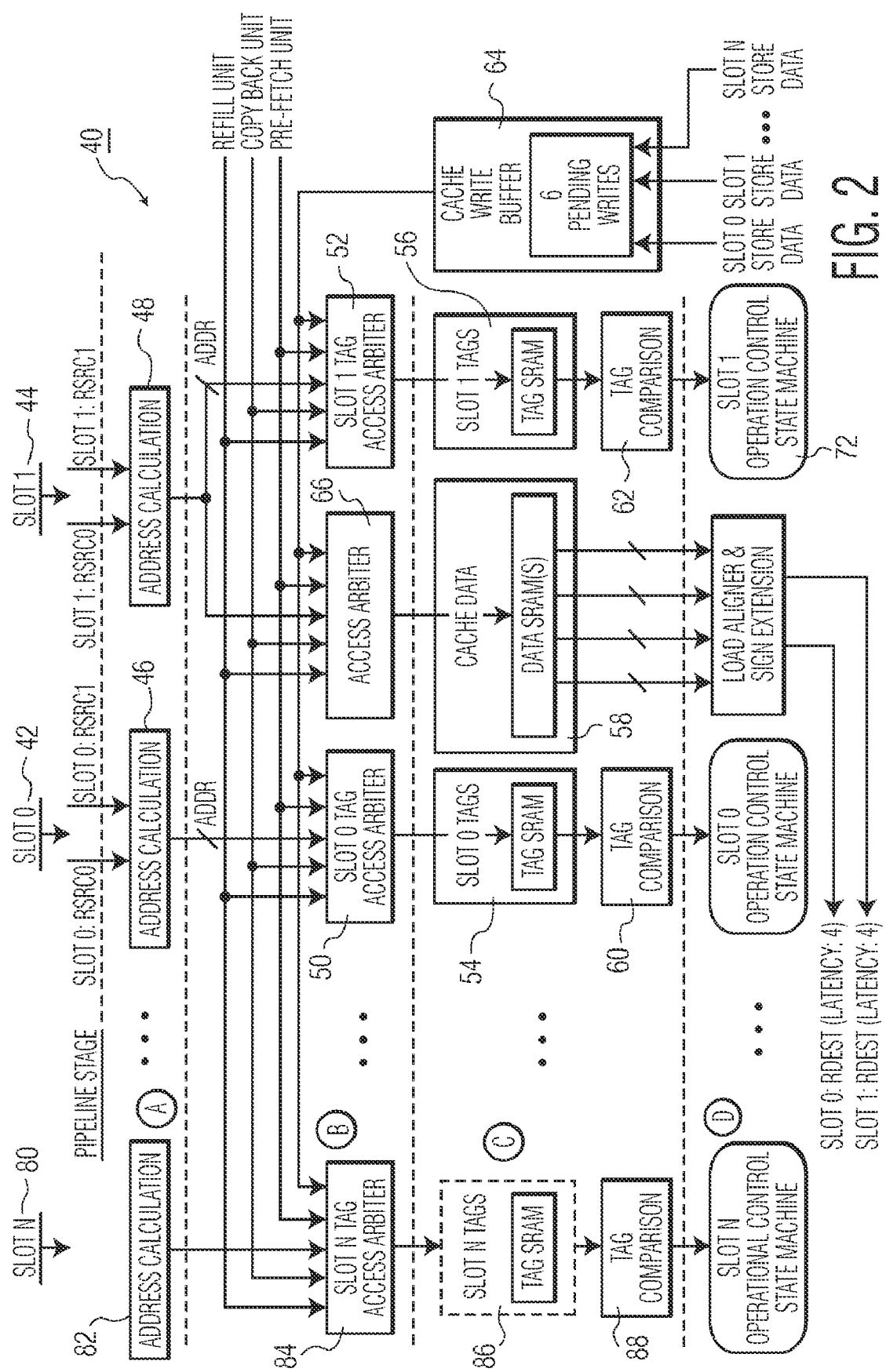
FIG. 2 is a block diagram and flow of an exemplary pseudo-multi-ported cache memory of the present invention that supports multiple simultaneous store operations and a simultaneous load operation.

Referring now to FIG. 2, a cache structure 40 in accordance with embodiments of the present invention is depicted. Additional tag memory structures for each additional issue slot, which supports a store operation is added in this exemplary embodiment. That is, FIG. 2 depicts an example of the exemplary cache system 40 that supports two simultaneous store operations or a store operation that is simultaneous with one load operation. The two store operations can use both issued slots, slot (0) 42 and slot (1) 44. Whereas a load operation can only be issued in the second issued slot, slot (1) 44.

First, discussing store operations, addresses are calculated in stage A in the address calculation boxes 46 and 48 for slots (0) 42 and (1) 44 respectively. At stage B, access is requested to the tag memories by the access arbiters 50 and 52 for access to the tag memory structure 54 and 56 respectively. Remember, any store operation has no need to access data in the data memory structure 58, because no data is being retrieved from the cache memory structure 58. At Stage C, the tag structure for the appropriate slot (0 or 1) for the store data is accessed. Thus for slot 0, the tag memory structure 54 is accessed and the tag comparison logic 60 derives a cache hit signal and other control information if a hit is accomplished. In the case of a cache miss, a cache line is allocated. In the case of a cache hit, the data to be stored is sent to the cache write buffer (CWB) 64. One write cycle later, the data is present in the CWB 64 and this buffer requests access to the data memory structure 58. When accessed to the data memory structured is granted to the CWB 64, the store data is put into the data memory structure 58 in the subsequent cycle. When accessed to the data memory structure is not granted, the update of the store data in the memory structure is postponed to a later point in time, at which time the CWB 64 is granted access to the data memory structure 58. In the meantime, the stored data remains pending. The CWB 64 provides storage capacity for up to six pending stores. The CWB may perform two simultaneous store data updates from the CWB into the data memory structure. This simultaneous update is restricted to those cases in which the updates do not conflict in terms of the structure's required SRAM memories. With simultaneous storage capabilities, the CWB 64 is less of a bottle neck for store data to be stored in the data memory 58 because more store data can be stored in the data memory 58 with each cycle.

Simultaneously, another store function can be performed in slot (1) wherein the address calculation is performed in the address calculation circuitry block 48 and then used to access the slot (1) tag memory 56 via the slot (1) tag access arbiter 52. A tag comparison is made in block 62 and a cache hit or miss is determined and such information is provided along with additional control information to the slot1 control state machine 72. If a cache hit in slot (0) is provided, the data to be stored in the cache data memory 58 is sent to the CWB 64. One cycle later, the data to be stored is present in the CWB 64 and the CWB 64 requests access to the data memory structure 58. When access is granted to the data memory structure 58, the data to be stored (the store data) is put into the data memory structure 58 in a subsequent cycle. When access is not granted, the update of the store data in the memory structure 58 is postponed to a later point in time, at which the CWB 64 is granted access to the memory structure 58. In the meantime, the store data remains pending in the CWB 64. As discussed above, in this exemplary embodiment the CWB 64 provides storage capacity for up to about six pending stores. With the usage of two tag memories, two simultaneous store operations can occur during the same clock cycles.

The embodiments of the present invention can also perform a simultaneous store and load operation in the same clock cycles. The load operation can only be performed in slot (1) 44 of this exemplary embodiment. Thus, the store operation is performed in slot (0) 42. The store operation in slot (0) is performed as described above. Meanwhile, the load operation, in slot (1), will have its address calculated in stage A in address calculation logic circuitry 48. In stage B, access is requested to the tag and data memory structures 56 and 58. In stage C, the memory structures are accessed via the access arbiter 66 for the data memory and access the slot (1) tag memory 56 via the slot (1) tag access arbiter 52. The data memory structure 58 provides the cache line located at the block size address. Furthermore, address conflicts with preceding store operations residing in either stage D or the CWB 64 are identified. The control state machine for slot (1) 72 acts upon the provided control information, which, for example, was derived from the tag comparison logic 62. In the case of a cache miss, the cache line is retrieved from memory by the refill unit. If there is an address conflict with a preceding or simultaneous store operation, the store data is first put into the data memory structure 58, and then the load operation is re-executed.

Discussed from another perspective, the CWB 64 can provide store data for two simultaneous (i.e. during the same clock cycle) store data updates from the CWB 64 into the data memory structure 58. This simultaneous update is restricted to those cases in which the updates do not conflict in terms of the structure's required SRAM memories. As a result, two CWB data store entries are moved in the same time frame and/or in a single cycle access to the data memory structure. This approach, known as store combining, prevents the CWB 64 from becoming a performance bottleneck in an exemplary cache design.

Figure 3:
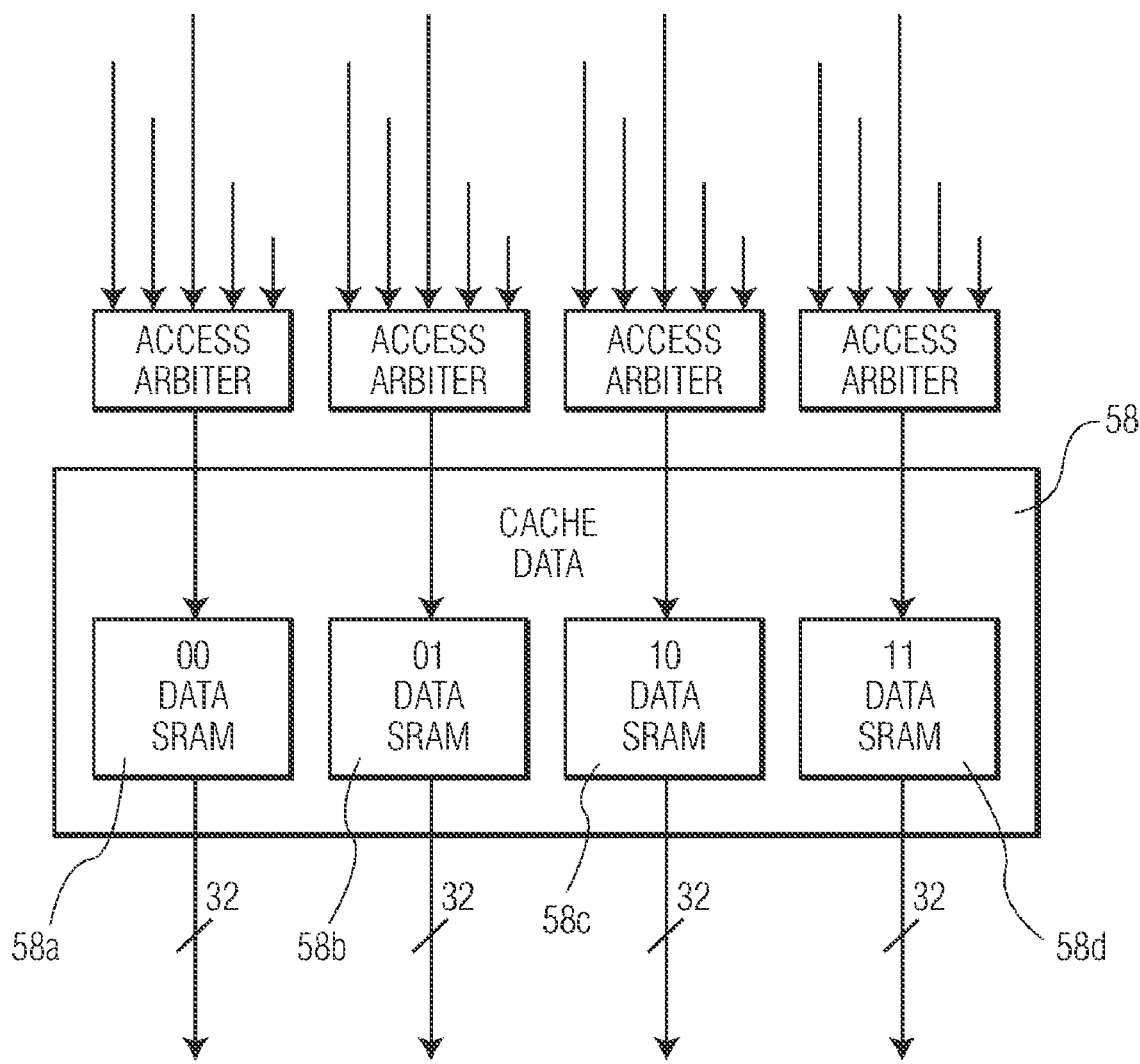
FIG. 3 is a block diagram of an exemplary embodiment of a cache data memory in accordance with the present invention that increases the effective bandwidth of data flow to the cache memory structure.

When multiple SRAM memory devices are used to implement the data memory structure 58, as shown in FIG. 3, cache data interleaving based on the address, allows for simultaneous access to the memory structure 58 from the CWB 64 and the issued operations. This interleaving also increases the effective bandwidth to the memory structure. For example, an implementation with four SRAMs 58A, 58B, 58C and 58D is shown in FIG. 3 (more than four separate SRAM devices can be used). The SRAM partitioning in this exemplary embodiment, is based on bits 3 and 2 of the address. That is, all byte elements that share the same address bits 3 and 2 (00, 01, 10, 11) reside in the same SRAM. As a result, cache line bytes are SRAM interleaved at the granularity of four byte elements. Therefore, a CWB access to SRAM "00" 58a can proceed simultaneously with a load operation access to SRAM "01" 58b. When this kind of simultaneous access to the memory device 58 is to be provided in an implementation of the exemplary embodiment that uses SRAM partitioning, access arbitration has to be performed at the level of the individual SRAMs, rather than for the data memory structure as a whole. As shown in FIG. 3, four access arbiters are utilized to enable access of the individual SRAMs.

In another exemplary embodiment of the present invention N simultaneous store operations can be performed in the cache system and pipeline. N is an integer that is 2 or larger. Referring back to FIG. 2, the nth slot 80 would perform address calculation 82 at stage A and access arbitration 84 would be performed at step B. Slot (N) tags 86 would be accessed and tag comparison functions 88 would be performed to determine a hit or miss in stage C. Essentially, the nth slot 80 would perform a store operation in the same manner as either slot 0 or 1. Thus, embodiments of the present invention would allow for N simultaneous store functions or N−1 simultaneous store functions along with one simultaneous load function. This functionality is completed by increasing the tag memory size of the cache memory, which takes up less space than increasing the cache data memory size of a cache memory.

A person of ordinary skill in the art would understand and appreciate the multitude of variations with respect to a multiple simultaneous store cache memory or multiple store and load cache memory described in this Detail Description of the Exemplary Embodiments of the invention. Thus, a few of the preferred exemplary embodiments of the invention have only been shown and described. It will be understood that the invention is not limited to the embodiments disclosed, but is capable of additional rearrangements, modifications and substitutions without departing from the invention as set forth and defined by the following claims. Accordingly, it should be understood that the scope of the present invention encompasses all such arrangements and is solely limited by the claims.

The invention claimed is:

1. An electronic circuit with a cache system comprising:
a single-ported cache data memory;
a first slot tag SRAM(Static Random Access Memory) and a second slot tag SRAM;
a first slot address calculation logic circuit for calculating a first address for control of storing, in the single-ported cache data memory, first slot data for a first issue slot;
a first slot tag arbiter that receives the first address from said first slot address calculation logic circuit for controlling access to the first slot tag SRAM;
a second slot address calculation logic circuit for calculating a second store address for control of storing in, or loading from, the single-ported cache data memory, second slot data for a second issue slot;
a second slot tag arbiter that receives the second address from said second slot address calculation logic circuit for controlling access to the second slot tag SAM;
a cache write buffer configured for buffering the first slot data, and for buffering the second slot data in case of the storing of the second slot data in the single-ported cache data memory, and comprising:
a first buffer input for receiving the first slot data;
a second buffer input for receiving the second slot data;
a buffer output for supply of the buffered first slot data and the buffered second slot data to the single-ported cache data memory.

2. The electronic circuit of claim 1, comprising an access arbiter for controlling access to the single-ported data cache memory, such that in case the second issue slot requests loading the second slot data from the single-ported cache data memory, the access arbiter is configured for granting, to the second issue slot, access to the single-ported data cache memory and for preventing the cache write buffer from accessing the single-ported data cache memory, and the cache write buffer is operative to buffer the first slot data.

3. The electronic circuit of claim 1, wherein said single-ported cache data memory comprises a plurality of SRAM devices for carrying out data interleaving based on memory addresses.

4. The electronic circuit of claim 3, wherein said cache write buffer's access to said cache data memory is performed during the same clock cycle with a load operation to said cache data memory.

5. The electronic circuit of claim 1, wherein said cache system is a pseudo-multi-ported cache system.

6. The electronic circuit of claim 1, further comprising at least a third slot tag SRAM; a third slot address calculation logic circuit for calculating a third address for control of storing, in the single-ported cache data memory, third slot data for a third issue slot; and a third slot arbiter that receives the third slot address from the third slot address calculating logic circuit for controlling access to the third slot tag SRAM; such that the cache write buffer has a third buffer input for receiving the third slot data, and the cache write buffer is configured for supplying the buffered third slot data to the single-ported cache data memory via the buffer output.

* * * * *

UNITED STATES PATENT AND TRADEMARK OFFICE
CERTIFICATE OF CORRECTION

PATENT NO. : 7,975,093 B2  
APPLICATION NO. : 12/090689  
DATED : July 5, 2011  
INVENTOR(S) : Van De Waerdt et al.

Page 1 of 1

It is certified that error appears in the above-identified patent and that said Letters Patent is hereby corrected as shown below:

Column 7, line 40, in Claim 1, delete "SAM;" and insert -- SRAM; --.

Signed and Sealed this

Thirteenth Day of December, 2011

David J. Kappos
*Director of the United States Patent and Trademark Office*